(12) United States Patent
Matthias

(10) Patent No.: US 7,879,482 B2
(45) Date of Patent: Feb. 1, 2011

(54) BATTERY PACK

(75) Inventor: Wolf Matthias, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 927 days.

(21) Appl. No.: 11/693,970

(22) Filed: Mar. 30, 2007

(65) Prior Publication Data
US 2007/0238012 A1 Oct. 11, 2007

(30) Foreign Application Priority Data
Apr. 7, 2006 (DE) .................. 10 2006 018 003

(51) Int. Cl.
*H01M 2/10* (2006.01)
*H01R 3/00* (2006.01)
(52) U.S. Cl. ............... 429/99; 429/97; 439/500
(58) Field of Classification Search .......... 429/96, 429/97, 99, 100; 439/500
See application file for complete search history.

(56) References Cited

U.S. PATENT DOCUMENTS

| 3,999,110 A | 12/1976 | Ramstrom et al. |
| 5,368,954 A | 11/1994 | Bruns |
| 6,071,639 A * | 6/2000 | Bryant et al. ............. 429/97 |

FOREIGN PATENT DOCUMENTS

WO 2006/040204 4/2006

* cited by examiner

*Primary Examiner*—Ula C Ruddock
*Assistant Examiner*—Thomas H. Parsons
(74) *Attorney, Agent, or Firm*—Michael J. Striker

(57) ABSTRACT

In a battery pack for an electrical device having a base body, a locking unit for locking the base body to the electrical device, and at least one battery cell, the battery pack has a fastening module, which is intended for securing the locking unit to the battery cell.

17 Claims, 4 Drawing Sheets

// BATTERY PACK

CROSS-REFERENCE TO A RELATED APPLICATION

The invention described and claimed hereinbelow is also described in German Patent Application DE 102006018003.8 filed on Apr. 7, 2006. This German Patent Application, whose subject matter is incorporated here by reference, provides the basis for a claim of priority of invention under 35 U.S.C. 119(a)-(d).

BACKGROUND OF THE INVENTION

The invention is based on a battery pack for an electrical device.

A battery pack for a hand power tool is known. For supplying current to the hand power tool, it has a set of battery cells. The battery pack is also provided with a locking unit, which serves to lock onto a hand power tool handle.

SUMMARY OF THE INVENTION

The invention is based on a battery pack for an electrical device, having a base body, a locking unit for locking the base body to the electrical device, and at least one battery cell.

It is proposed that the battery pack has a fastening module, which is intended for securing the locking unit to the battery cell. As a result, the effort and expense of assembly when the battery pack is put together can advantageously be reduced. Moreover, fastening means for fastening the locking unit to the base body can be dispensed with. The term "module" should be understood in this connection to mean in particular a component of the battery pack that is other than the base body and that can be installed in the base body when the battery pack is put together.

The base body is preferably embodied as a battery pack housing. The fastening module preferably represents a fastening interface between at least the locking unit and the battery cell. To that end, the fastening module is expediently has one fastening means for fastening the locking unit and one fastening means for fastening the battery cell. As a result, a structural unit with at least the battery cell, the fastening module, and the locking unit can be formed that can be preassembled separately from the base body and after its assembly be built in cohesively into the base body.

The fastening module can furthermore have a fastening means for fastening to the base body, or the fastening module may be fastened by a form-locking connection in the base body. For instance, the fastening module can be clamped in place in the base body. To achieve economies of components and assembly steps, the fastening module is preferably embodied in one piece.

It is furthermore proposed that the fastening module grips the battery cell in the installed state. As a result, an especially compact design of the battery pack can be achieved. For instance, the fastening module has a receiving region, which is intended to receive the battery cell, as a result of which secure bracing of the battery cell on the fastening module can be attained.

If the fastening module is intended for making a form-locking connection with the battery cell, the effort and expense of assembly can be reduced still further.

In this connection, a secure form-locking connection can be achieved in a simple way if the fastening module has a detent element for making a detent connection with the battery cell. For instance, the detent element can be embodied as a snap arm which snaps around the battery cell.

Advantageously, the fastening module has a contact-holding means, which is intended for holding electrical contact elements. As a result, still further economies of components and installation space are attainable. The contact elements advantageously serve to make an electrical contact with electrical counterpart connection means of the electrical device. By means of the contact elements, alternatively or in addition, an electrical contact with a charger for charging the battery cell can be made. The contact elements are embodied for instance as contact latches or contact cups.

In this connection, it is proposed that the fastening module has a receiving element for receiving the battery cell, which element forms the contact-holding means, as a result of which an especially compact construction and robust bracing of the contact elements can be achieved. Preferably, the receiving element is formed by a portion of the fastening module that has two diametrically opposed walls, one wall forming a receiving region for the battery cell and the second wall forming the contact-holding means. Especially short connection distances for connecting the contact elements to the battery cell can be achieved as a result.

Further economies of components and installation space are possible if the battery pack has at least one electrical connecting means for making an electrical connection with the battery cell, the fastening module having a retaining means, which is intended for holding the connecting means. Economies in terms of assembly steps can also be attained if the retaining means is embodied integrally with the fastening module. For instance, the retaining means is embodied as a detent element, in which, in the installed state of the battery pack, the electrical connecting means is snapped into place.

In a preferred embodiment of the invention, it is proposed that the fastening module is intended for making a form-locking connection with the locking unit, as a result of which tool-free fastening of the locking unit and thus especially low effort and expense of assembly can be attained. In particular, the fastening module may have a fastening means which is intended for making a detent connection with the locking unit.

It is also proposed that the battery pack includes an actuation unit for actuating the locking unit, and the fastening module has a receiving region of the fastening module, which region is intended for receiving the actuation unit. As a result, with a compact embodiment, a simple locking and unlocking mechanism can be attained. The actuation unit is preferably pivotably disposed on the fastening module, and the receiving region can be embodied as a pivot bearing for a pivot shaft of the actuation unit. The fastening module can furthermore have a slide face for sliding the actuation unit.

An electrical device, in particular an electric tool with an electrical device base body, such as a handle, is furthermore proposed. It advantageously has a battery pack, which is removable from the electrical device base body, a locking unit for locking the base body to the base base body of the electric tool, at least one battery cell, and a fastening module which is intended for fastening the locking unit to the battery cell. As a result, the effort and expense of assembly can advantageously be reduced. The electrical device can furthermore be embodied as a charger for recharging the battery pack.

Further advantages will become apparent from the ensuing description of the drawings. In the drawings, one exemplary embodiment of the invention is shown. The drawing, description and claims include numerous characteristics in combination. One skilled in the art will expediently consider the characteristics individually as well and put them together to make useful further combinations.

DESCRIPTION OF THE PREFERRED EMBODIMENT

Figure 1:
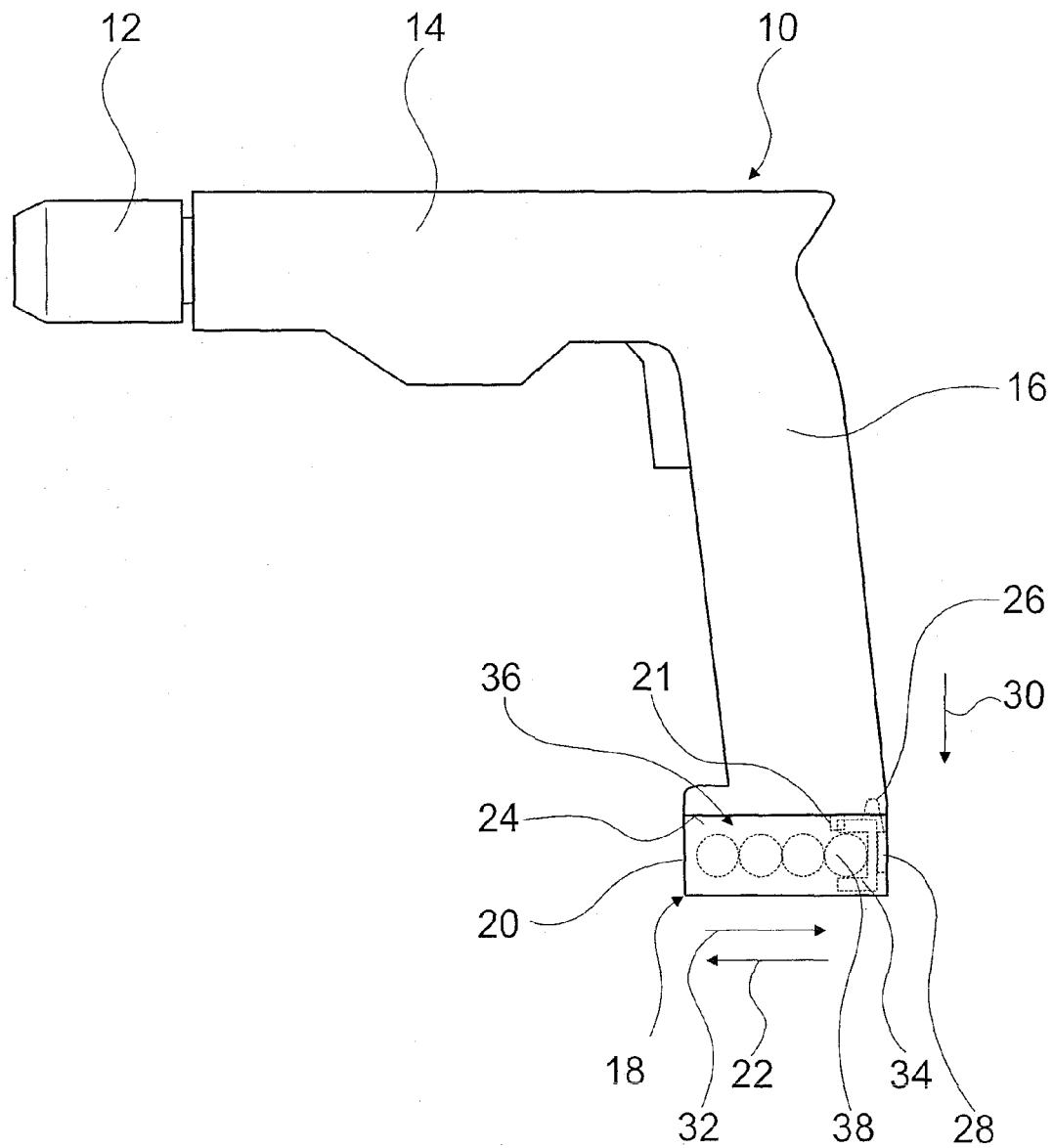
FIG. 1 shows a rechargeable-battery-operated power screwdriver with a handle, a battery pack locked to the handle, and a fastening module located in the battery pack in accordance with the present invention.

FIG. 1 shows an electrical device 10 embodied as a hand power tool. The hand power tool is embodied as a rechargeable-battery-operated power screwdriver. It has an electrical device base body 14, to which a tool receptacle 12 is secured. The electrical device base body 14 furthermore forms a handle 16, on which a battery pack 18 is located in locked fashion. The battery pack 18 includes a base body 20, which is embodied as a battery pack housing. The electrical device 10 furthermore has electrical device connection means 21 for making an electrical connection with the battery pack 18. The battery pack 18 is embodied as a sliding battery pack.

For locking the battery pack 18 to the handle 16, the base body 20 is thrust in a sliding direction 22 along the handle 16, specifically along a lower outer face 24 of the handle 16 essentially perpendicular to the longitudinal direction of the handle 16. In the position shown in the drawing, the battery pack 18 is locked on the handle 16 by a locking unit 26 embodied as a metal spring. In its locking position shown, this locking means is snapped into a detent recess, not shown in detail, of the handle 16.

By actuation of an actuating means 28 (shown schematically in FIG. 1), the battery pack 18 can be unlocked from the electrical device 10, as a result of which the locking unit 26 is moved in an unlocking direction 30. After unlocking of the battery pack 18, the base body 20 can be disconnected from the electrical device 10, specifically by sliding the base body 20 in a removal direction 32 along the lower outer face 24 of the handle 16. The sliding direction 22 and the removal direction 32 are oriented substantially transversely to the longitudinal direction of the handle 16.

The locking unit 26 and the actuation unit 28 are secured to a fastening module 34, which is described in further detail in the following drawing figures. A set 36 of battery cells, with four battery cells, is also located in the base body 20. One battery cell 38 is secured to the fastening module 34. The fastening module 34, the set 36 of battery cells, the locking unit 26, and the actuation unit 28 form a structural unit, which when the battery pack 18 is put together is preassembled separately from the base body 20 and built into the base body 20 after assembly.

Figure 2:
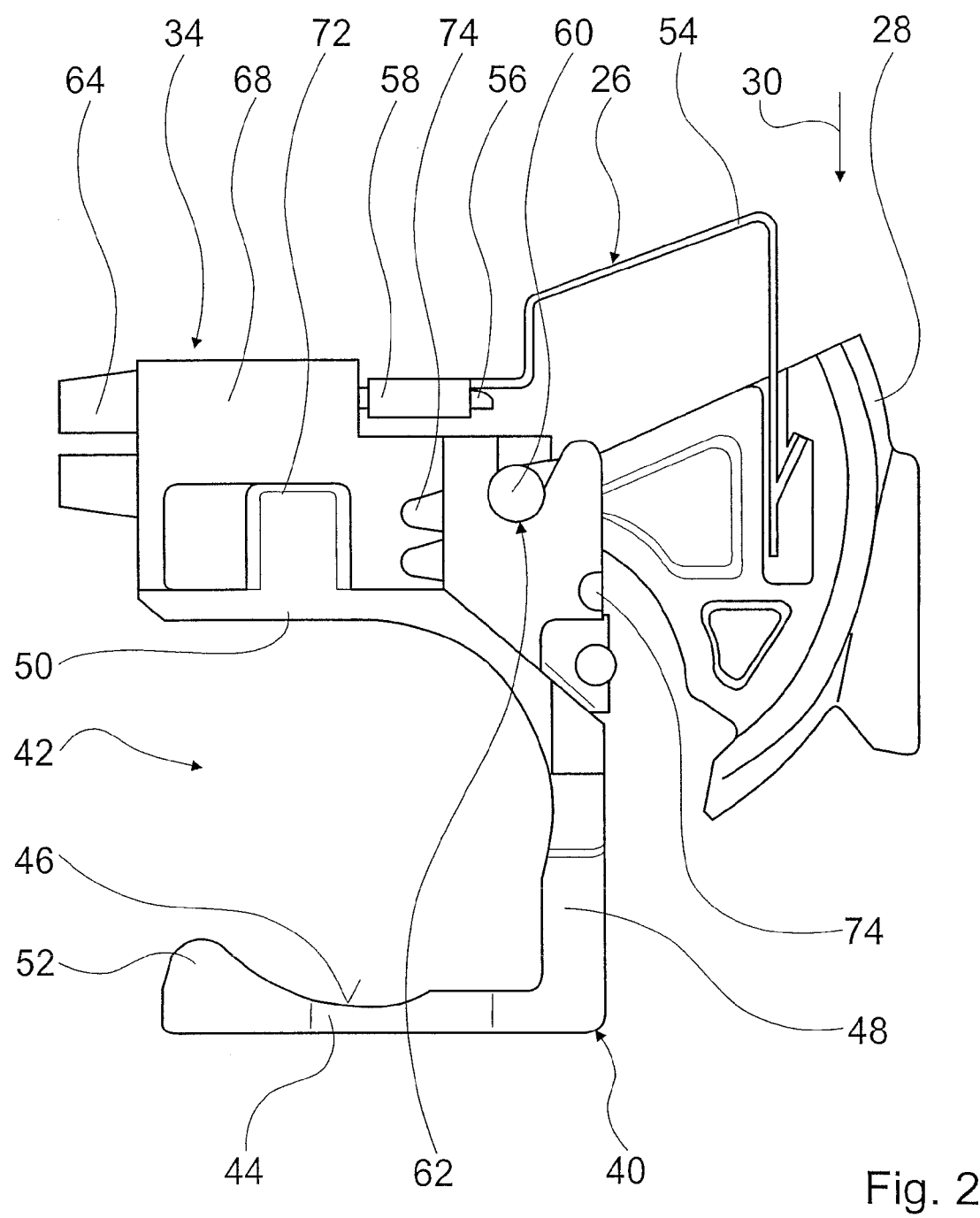
FIG. 2, the fastening module and a locking unit in accordance with the present invention in a side view.

FIG. 2, in a detail, shows the fastening module 34, locking unit 26 and actuation unit 28. The fastening module 34 has a receiving element 40, which defines a receiving region 42 in which the battery cell 38 is received in the assembled state. The receiving element 40 includes a base side 44, which in the installed state rests on a housing shell of the base body 20. The base side 44 furthermore forms a contact face 46, on which the battery cell 38 rests in the installed state. Perpendicular to the base side 44, the receiving element 40 continues in the form of a wall element 48, on which the assembled battery cell 38 likewise rests.

Finally, the receiving element 40 is continued as a roof element 50, which is oriented parallel to the base side 44. The receiving element 40 with the base side 44, wall element 48 and roof element 50, grips the battery cell 38 in the assembled state (see FIG. 1). A fastening means for fastening the battery cell 38 in the receiving region 42 is integrally formed onto the base side 44. It is embodied as a detent element 52, which rises as a pawl above the contact face 46. Diametrically opposite the detent element 52, an identical detent element 52 is integrally formed onto the base side 44 (see FIG. 5). Upon assembly of the battery cell 38, the battery cell 38 snaps by means of the detent elements 52 into the receiving region 42 that is defined by the base side 44, the wall element 48, and the roof element 50.

The locking unit 26 is also secured to the fastening module 34. By means of the fastening module 34, the locking unit 26 is fastened to the battery cell 38, which in particular makes it possible to form a structural unit which, with at least the battery cell 38, the fastening module 34, and the locking unit 26, can be preassembled as described above separately from the base body 20 and after its assembly can be installed as a cohesive unit into the base body 20. The locking unit 26 is embodied as a metal leaf spring, which has a detent protrusion 54. In the locked state of the battery pack 18, shown in FIG. 1, the detent protrusion 54 has snapped into a detent recess in the handle 16.

The locking unit 26 is braced on one side on the fastening module 34. For that purpose, the fastening module 34 has a fastening means 56, embodied as a strut, about which one end 58 of the locking unit 26 is snapped. This makes tool-free fastening of the locking unit 26 to the fastening module 34 possible. On the other side, the locking unit 26 is fastened to the actuation unit 28, which is embodied in the form of a control button. To that end, the locking unit 26 is snapped into the actuation unit 28. The actuation unit 28 is moreover located pivotably on the fastening module 34. To that end, it has a pivot shaft 60.

The fastening module 34 has a receiving region 62, embodied as a pivot bearing, in which the pivot shaft 60 is received. Beginning in the locked position shown in FIG. 1, by user operation of the actuation unit 28 and a pivoting motion of the actuation unit 28 that is tripped thereby, the base body 20 can be unlocked from the electrical device 10, the detent protrusion 54 being moved in the unlocking direction 30. When the detent protrusion 54 moves, the end 58 remains firmly in its position on the fastening module 34, and as a result a deformation of the locking unit 26 and a restoring force are engendered.

To produce an electrical connection between the set 36 of battery cells and the electrical device 10, or a further electrical device 100 (see FIG. 4) embodied as a charger, the battery pack 18 is provided with electrical contact elements 64 and 66, respectively. In FIG. 2, one of the contact elements 64 can be seen, while the contact elements 66 are visible in FIG. 3. The contact element 64 is located in a contact-holding means 68, which rises vertically from the roof element 50 (see also FIG. 3). The contact-holding means 68 furthermore has an extension, which forms the fastening means 54 for fastening the locking unit 26.

Figure 3:
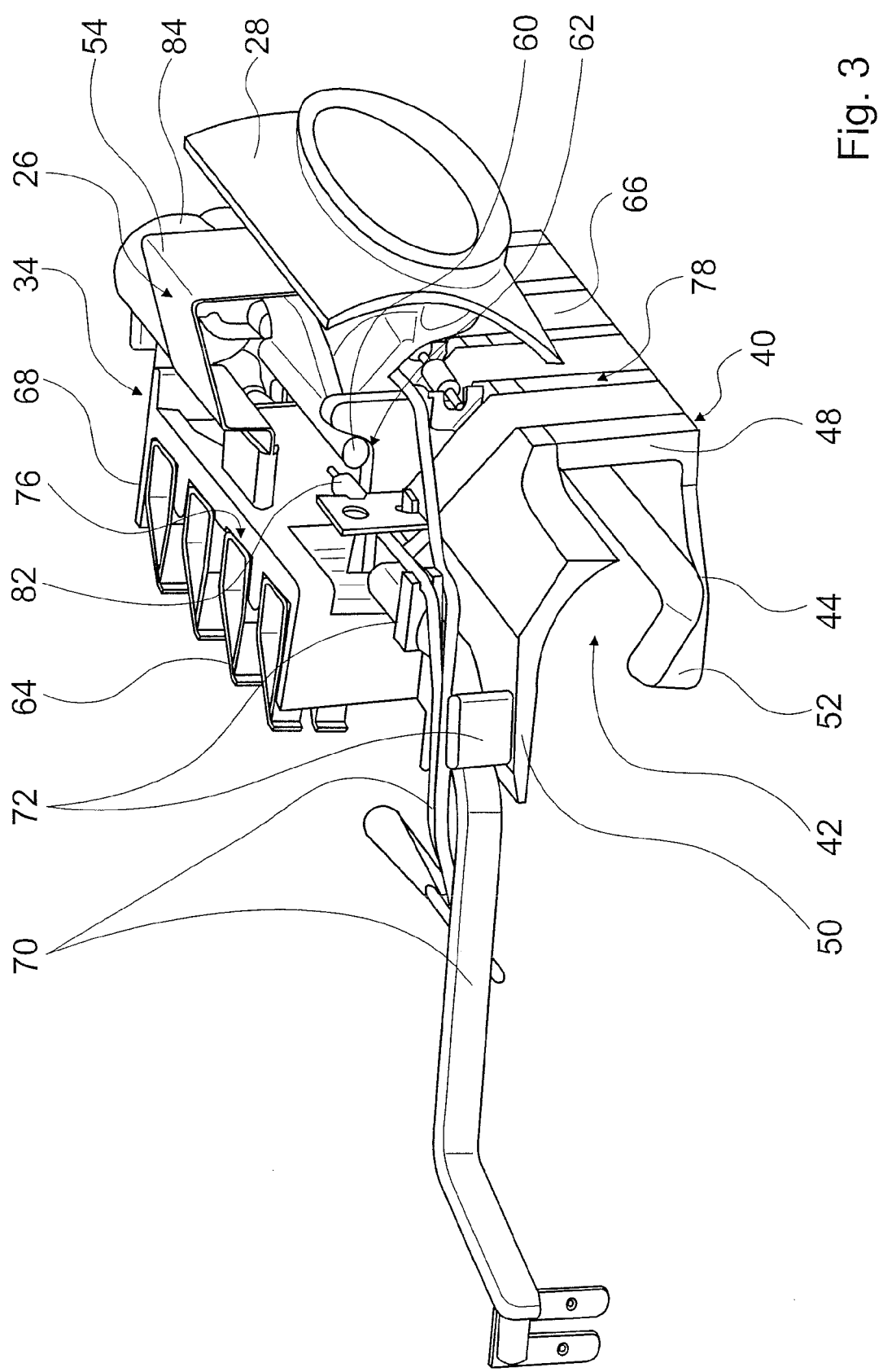
FIG. 3, the fastening module and the locking unit in accordance with the present invention in a perspective view.

The contact elements 64, 66 and the set 36 of battery cells are joined together by a set of electrical connecting means 70, which are embodied as cable connections and are shown in further detail in FIG. 3. For holding these connecting means 70, retaining means 72 are formed onto the fastening module 34, and the connecting means 70 is snapped into them or passed through them in the assembled state. Recesses 74 are also recessed out of the fastening module 34 and serve to guide the connecting means 70 (see also FIG. 3).

In FIG. 3, the fastening module 34, the locking unit 26, and the actuation unit 28 are shown in a perspective. The electrical connecting means 70 embodied as cable connections are also visible. They are snapped into the retaining means 72 of the fastening module 34, or passed through them. The contact-holding means 68 is also visible. It forms contact receiving regions 76, in each of which one of the contact elements 64 is held. Upon locking of the battery pack 18 to the electrical device 10, specifically upon sliding of the battery pack 18 along the outer face 24, the electrical device connection means 21 engage the contact elements 64 on the inside (see also FIG. 1).

The wall element 48 of the receiving element 40 forms a further contact-holding means 78. For this purpose, regions 80 (see FIG. 5) are recessed out of the receiving element 40, and one of the contact elements 66 is placed in each of these regions. These contact elements are embodied as metal contact laminations, which for making an electrical contact with an electrical device 100, shown in FIGS. 4 and 5 and embodied as a charger, serve to charge the set 36 of battery cells. Electrical components are also located on the fastening module 34, such as electrical resistors 82 for electrically encoding the set 36 of battery cells, and a short-circuit preventer 84.

Figure 4:
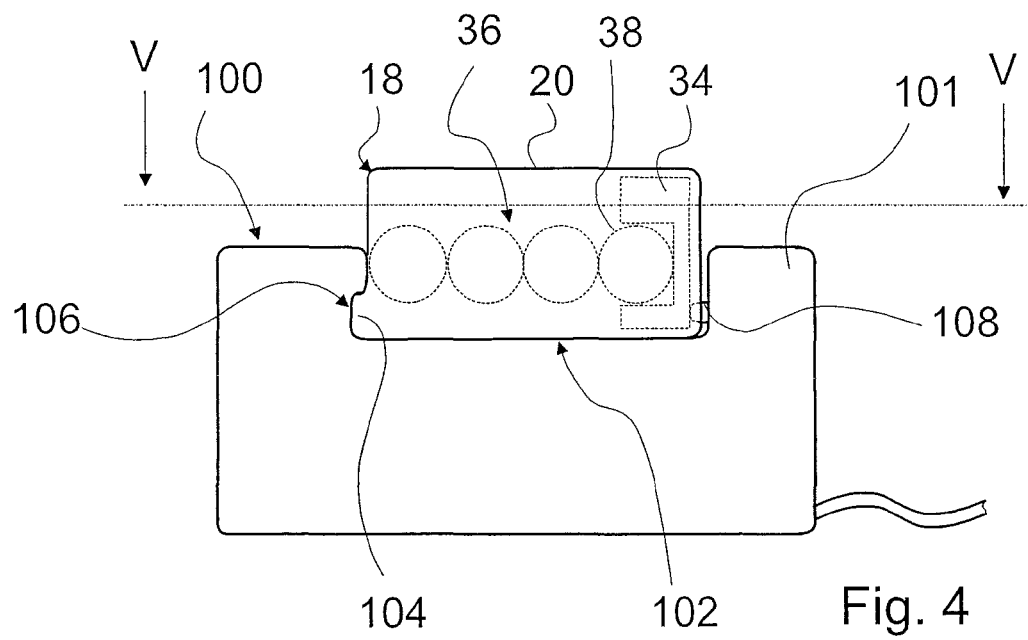
FIG. 4, the battery pack of FIG. 1, coupled to a charger in accordance with the present invention.

In FIG. 4, the battery pack 18 is shown, located in an electrical device 100 embodied as a charger. The electrical device 100 has an electrical device base body 101, embodied as a housing. Internal components of the battery pack 18 are schematically shown, specifically the set 36 of battery cells with the battery cell 38, and the fastening module 34. The electrical device base body 101 forms a receiving region 102, in which the battery pack 18 is placed. A detent region 104 is integrally formed onto the base body 20 and is snapped into a detent recess 106 of the electrical device 100. For making an electrical contact with the battery pack 18, the electrical device 100 is provided with electrical contacting elements 108, which are embodied as resilient contact laminations. These contacting elements 108 rest on the contact elements 66 of the battery pack 18 in a prestressed state (see also FIG. 5).

Figure 5:
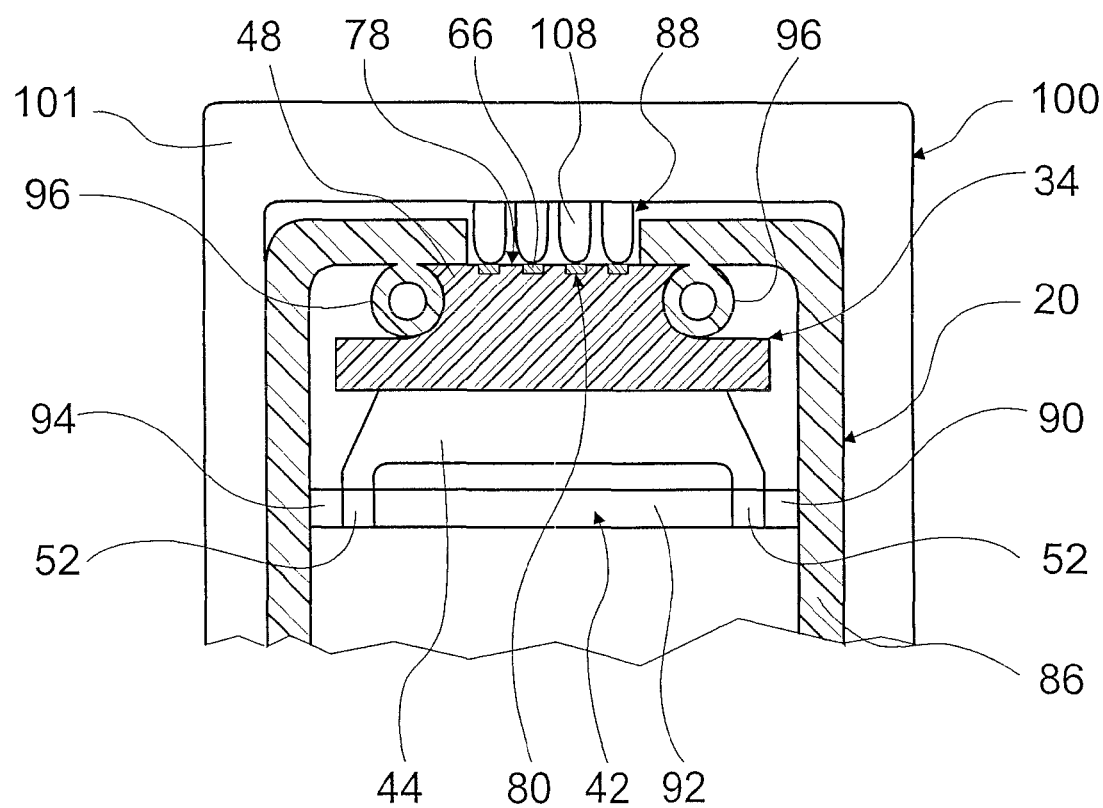
FIG. 5, a sectional view of the battery pack in the charger in accordance with the present invention, seen from above.

In FIG. 5, the location of the electrical device 100 and of the battery pack 18 is shown in a sectional view from above. A housing shell 86 of the base body 20 and the fastening module 34 are visible. The set 36 of battery cells is not shown, for the sake of simplicity. As described in conjunction with FIG. 3, the wall element 48 forms the contact-holding means 78, which has regions 80 of the wall element 48 that are recessed in the form of channels. One contact element 66, embodied as a contact lamination, is placed in each of these channels. Upon coupling of the battery pack 18 to the electrical device 100 embodied as a charger, the contacting elements 108 engage an opening 88 in the housing shell 86 and enter into contact with the contact elements 66.

In the process, the contacting elements 108 are pressed, so that they rest on the contact elements 66 in the prestressed state. The detent elements 52 for fastening the battery cell 38 to the fastening module 34 are also visible. The housing shell 86 moreover has bracing means 90, 92, 94, embodied as ribs. The bracing means 90, 92, 94, in cooperation with the detent elements 52, form a bracing region that is uniform over the width of the housing shell 86, for bracing the battery cell 38.

The fastening module 34 is furthermore braced on screw receptacles 96 in the housing shell 86.

It will be understood that each of the elements described above, or two or more together, may also find a useful application in other types of constructions differing from the type described above.

While the invention has been illustrated and described as embodied in a battery pack, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A battery pack for an electrical device, comprising:
a base body;
a locking unit for locking said base body to the electrical device;
at least one battery cell;
a fastening module provided for fastening said locking unit to said at least one battery cell; and
an actuating unit for actuating said locking unit, wherein said actuating unit is pivotably disposed on said fastening module.

2. A battery pack as defined in claim 1, wherein said fastening module is configured so that it grips said battery cell in an installed state.

3. A battery pack as defined in claim 1, wherein said fastening module is configured so as to make a form-locking connection with said battery cell.

4. A battery pack as defined in claim 3, wherein said fastening module has a detent element for making a detent connection with said battery cell.

5. The battery pack as defined in claim 4, wherein the detent element is a snap arm which snaps around the at least one battery cell.

6. A battery pack as defined in claim 1, wherein said fastening module has contact-holding means which is configured for holding electrical contact elements.

7. A battery pack as defined in claim 6, wherein said fastening module has a receiving element for receiving said battery cell, said receiving element forming said contact-holding means.

8. A battery pack as defined in claim 1; and further comprising at least one electrical connecting means for making an electrical connection with said battery cell, said fastening module having a retaining means for holding said connecting means.

9. A battery pack as defined in claim 1, wherein said fastening means is configured for making a form-locking connection with said locking unit.

10. A battery pack as defined in claim 1, wherein said fastening module has a receiving region configured for receiving said actuation unit.

11. The battery pack as defined in claim 1, wherein the at least one battery cell, the fastening module, and the locking unit are configured to be fastened together in an uncounted state to a cohesive structural unit.

12. The battery pack as defined in claim 1, wherein the locking unit is a metal leaf spring.

13. The battery pack unit as defined in claim 12, wherein the metal leaf spring has a detent protrusion.

14. The battery pack as defined in claim 1, wherein the fastening module has a fastening means, wherein an end of the locking unit is snapped about said fastening means.

15. The battery pack as defined in claim 1, wherein at least one electrical resistor is located on the fastening module for electrically encoding the at least one battery cell.

16. The battery pack as defined in claim 1, wherein at least one short-circuit preventer is located on the fastening module.

17. An electrical device, comprising:
an electrical device base body; and
a battery pack removable from said electrical device base body, said battery pack including a base body, a locking unit for locking said base body to the electrical device, at least one battery cell, a fastening module provided for fastening said locking unit to said at least one battery cell, and an actuating unit for actuating said locking unit, wherein said actuating unit is pivotably disposed on said fastening module.

* * * * *